April 23, 1929.  R. TAYLOR ET AL  1,710,387
PISTON
Filed March 19, 1928  4 Sheets-Sheet 1

Inventors
Reginald Taylor, and
Henry Taylor
by Smith & Cameron
their Attorneys

April 23, 1929.　　R. TAYLOR ET AL　　1,710,387
PISTON
Filed March 19, 1928　　4 Sheets-Sheet 2

Inventors
Reginald Taylor, and
Henry Taylor
by Smith & Cameron
their Attorneys

April 23, 1929. R. TAYLOR ET AL 1,710,387
PISTON
Filed March 19, 1928   4 Sheets-Sheet 3

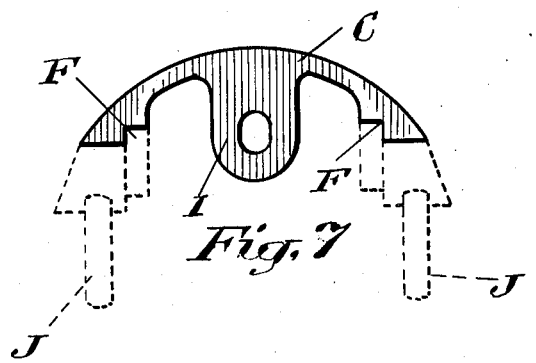
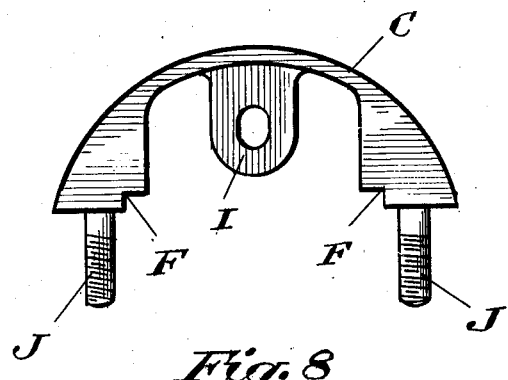
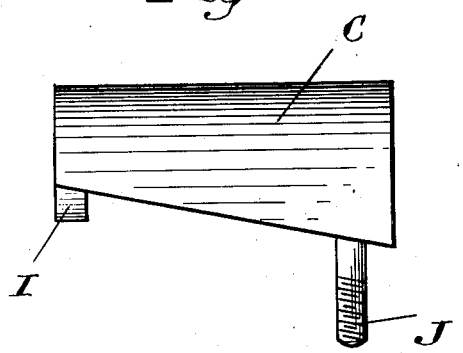

Patented Apr. 23, 1929.

1,710,387

UNITED STATES PATENT OFFICE.

REGINALD TAYLOR AND HENRY TAYLOR, OF TORONTO, ONTARIO, CANADA.

PISTON.

Application filed March 19, 1928. Serial No. 262,916.

Our invention relates to an improvement in pistons adapted to use in connection with all kinds of internal combustion and compression cylinders in engines, and air compressors of various types, wherein the crosshead is a part of the piston and the reciprocal mechanism.

The piston functions as an important factor in generating power where explosive gas is the element of energy, and which requires a snug and gas tight contact with the interior walls of the cylinder, and where high and low speed of reciprocal action of the piston is maintained, wear and tear frequently enlarges the clearance between the piston and the cylinder walls, with the result that what may be commonly known as knocks develop.

The usual method adopted under these circumstances is to scrap the piston and install a new one of larger diameter.

Our invention relates to a piston adapted to be adjusted whereby the diameter and periphery may be increased to make up for the wear and tear both to the piston and the cylinder walls to take up the clearance and center the piston.

The adjustments are made in a portion of the piston that in no way alters the diameter or the circumference of the head or upper portion of the piston, thereby providing for installing the expansion rings into the ring grooves formed in the periphery of the head of the piston, to create a gas tight seal between the piston and the cylinder walls.

In the drawings:

Figure 7 is a plan view of the adjustable portion looking at it from the upper end;

Figure 8 is a plan view of the adjustable portion from the bottom end, and

Figure 9 is a side elevational view of the adjustable portion of the piston removed.

Similar reference letters refer to similar parts throughout the drawings.

Figure 1:
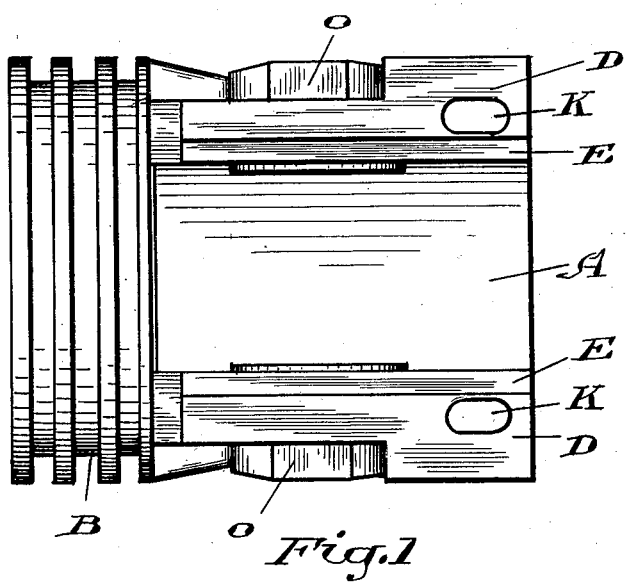
Figure 1 is a side elevational view of the piston with the adjustable portion removed.
Figure 2:
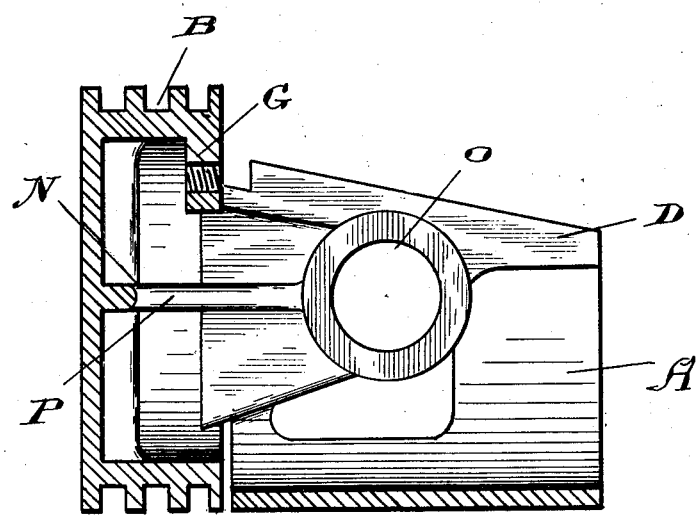
Figure 2 is a sectional view through the piston with the adjustable portion removed.
Figure 3:
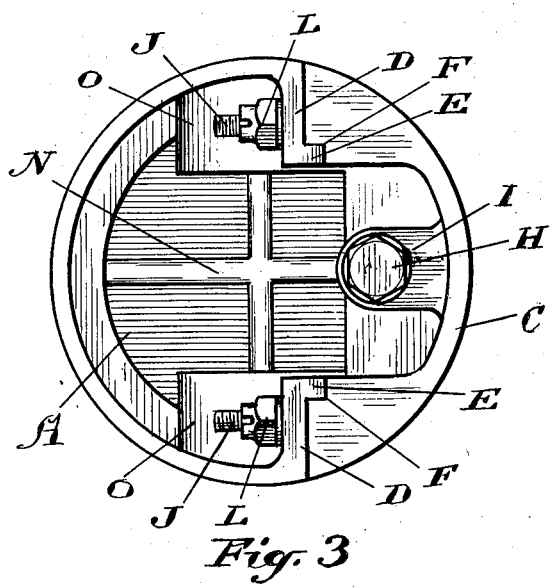
Figure 3 is a bottom plan view of the piston.
Figure 4:
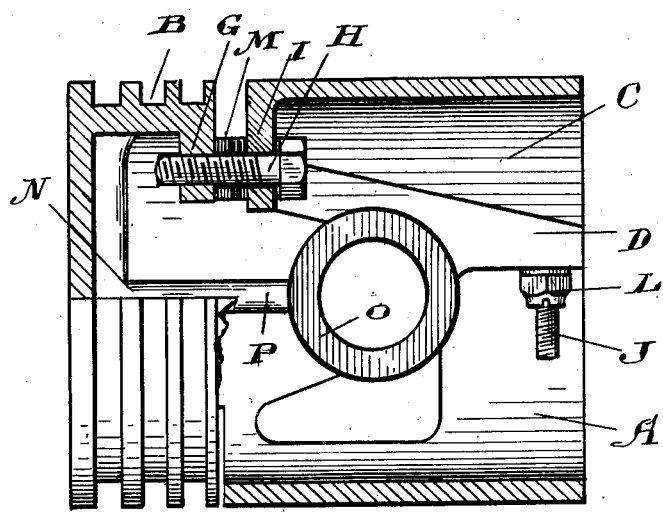
Figure 4 is a side elevational view of the piston partially in section.
Figure 5:
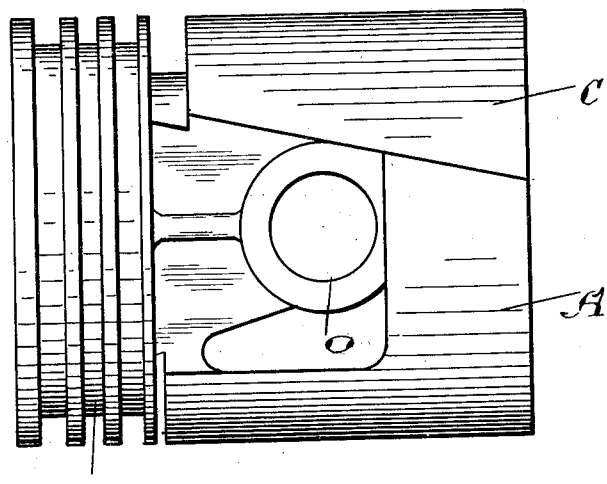
Figure 5 is a side elevational view of the complete piston.
Figure 6:
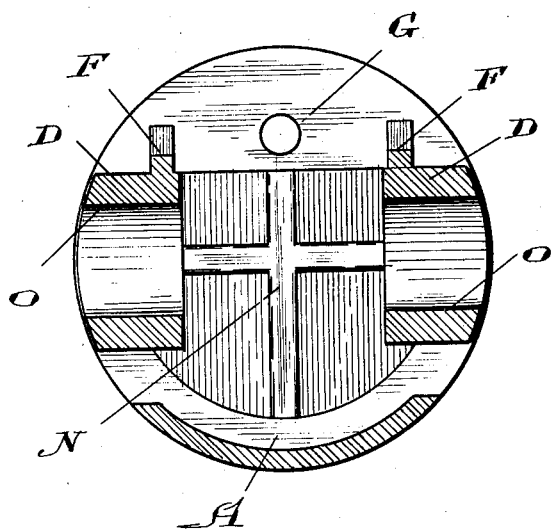
Figure 6 is a sectional view through the piston with the adjustable portion removed.

The piston in external conformity embodies the ordinary design of piston, having formed in the upper periphery a series of expansion ring grooves B.

C designates a segmental section removably secured in the sleeve portion of the piston A, and adapted to be adjusted in axial and radial relation thereto.

The segmental section C sets and rides on guide-ways D, formed in the interior of the piston. The guide-ways D are inclined at an angle with the axial direction through the piston, and having guiding and mounting ribs E formed along the inner edges to engage with a shoulder and recess F formed along the inner edge of the corresponding angle face of the section C.

G designates a lug formed with the interior wall of the piston, in the upper end. The lug is drilled and tapped to receive a fastening screw bolt H, by which the section C is secured in position, in one direction.

Formed integral with the upper end of the section C is a lug I. The lug is drilled for receiving the screw bolt H, it corresponds in shape and location with the lug G. Interposed between the adjacent faces of the lugs G and I and held therebetween, by the fastening screw bolt H, are a pack of thin metal shims, which may be added to or taken out accordingly with the purpose of increasing or reducing the interval between the respective lugs G and I. By the removal of a shim or shims the interval will be correspondingly reduced, which will allow the section C to be adjusted in axial direction towards the head portion of the piston, thereby also increasing the diametrical lines of the piston in the direction in which the section is positioned, and it also increases the periphery of the piston.

Formed in the lower end and projecting inwardly therefrom, are retaining screw threaded pins J—J, being adapted to pass through elongated bores K—K formed through the guide-ways D.

On the ends of the pins J—J are lock nuts L, adapted to screw up on the pins to maintain the section C rigidly secured on the guide-ways and to prevent radial displacement of the adjustable parts.

Formed integrally with the interior portion of the head end of the piston are reinforcing ribs N, and extending down the inner side walls of the sleeve to join with the wrist pin journals O, are ribs P. The different ribs are for the purpose of strengthening the sleeve portion of the piston to the extent of the weakening thereby in proportion to the removable section.

While we have shown and described the invention embodying only one segmental adjustable portion fitted in the sleeve of the piston, we may in the case of large pistons introduce two or more adjustable sections, for increasing the diameter and periphery of the piston.

To make the necessary adjustments to the piston, the lock nuts L—L are unscrewed to loosen up the pins J—J, the screw bolt H is then unscrewed from out of the lug G, and one or more of the shims M are removed, as may be necessary. The segmental section C is then adjusted in co-operative relation with the guide ways towards the head of the piston, to the extent of the width of the shim or shims removed. The screw bolt H is then replaced and tightened up into the lug G, and the lock nuts L—L are then tightened up on the pins J—J.

By this adjustment the diameter in the direction in which the section C is positioned is increased to the necessary diameter to engage the walls of the cylinder, and at the same time the periphery is correspondingly increased.

What we claim as new and desire to secure by Letters Patent is:

1. A piston of the class described having an adjustable segmental section formed in the sleeve portion thereof, said section being adjustably secured to guide-ways formed with the interior of the sleeve portion, said guide-ways being formed at an angle with the axial direction through said piston, an inwardly projecting lug formed with said sleeve, a correspondingly shaped lug formed with said segmental section, a pack of removable shims interposed between said lugs, a fastening screw bolt for securing said lugs and shims, setting pins projecting from said section, said pins projecting through elongated slots in said guide-ways, with means for securing said pins in said slots.

2. A piston of the class described having an adjustable segmental section formed in the sleeve portion thereof, said section adjustably secured on guide-ways formed at an angle with the axial direction through said piston, a lug formed on the upper end of said section and a lug formed in the sleeve portion of said piston, a plurality of removable shims interposed and secured in between said lugs, setting pins projecting inwardly from the lower end of said section, said pins passing through elongated slots formed in said guide-ways, lock-nuts on the ends of said pins for securing the pins in said slots, the said section being adapted to adjustment in radial correlated relation by the removal of one or more of said shims.

Signed at Toronto, this 15th day of March, 1928.

REGINALD TAYLOR.
HENRY TAYLOR.